W. W. HUBBELL.

Shell.

No. 521. Reissued Jan. 19, 1858.

Witnesses.
Charles D. Freeman
Penrose Hall

Wm. W. Hubbell

N. PETERS, PHOTO-LITHOGRAPHER, WASHINGTON, D. C.

UNITED STATES PATENT OFFICE.

WILLIAM W. HUBBELL, OF PHILADELPHIA, PENNSYLVANIA.

IMPROVEMENT IN ECCENTRIC EXPLOSIVE SHELLS.

Specification forming part of Letters Patent No. 14,133, dated January 22, 1856; Reissue No. 521, dated January 19, 1858.

*To all whom it may concern:*

Be it known that I, WILLIAM W. HUBBELL, of the city of Philadelphia, State of Pennsylvania, have invented a new and useful Improvement in Eccentric Explosive Shells; and I do hereby declare the following to be a full, clear, and exact description thereof, reference being had to the annexed drawings.

The nature of my invention consists in arranging a given weight of metal for a spherical shell of any size to fire from cannon or shell-guns in such manner that the greatest amount of *vis inertiæ* is obtained to keep or retain the fuse-hole in front in the flight of the shell with the least proportionate displacement of the powder-space in the interior of the shell by combining with and uniformly around the fuse-hole the flat-based segment of a solid sphere, and with and behind this the segment of a hollow sphere, forming externally a smooth spherical surface, and internally the eccentric form with flat base around the fuse-hole.

Figure 1:
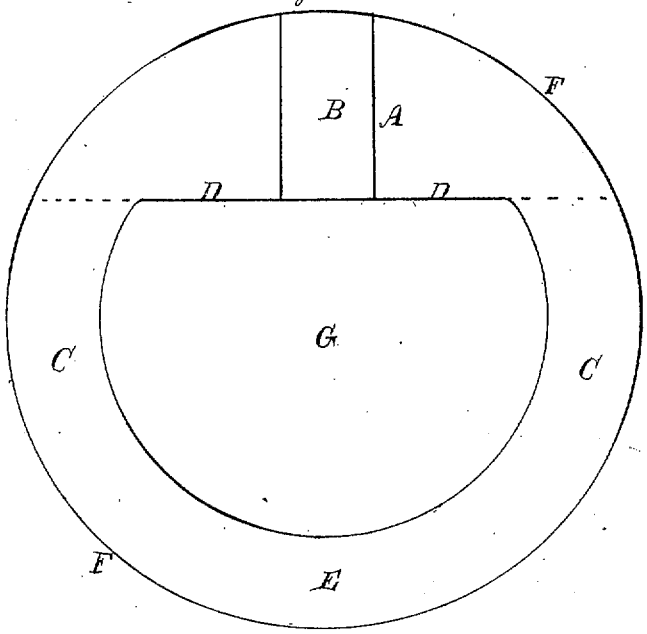

In the accompanying drawings, Figure 1 is a section through the fuse-hole, head, and center of the shell. A is a flat-based segment of a solid sphere, having the fuse-hole B through its center, cast onto a segment, C C, of a hollow sphere, in one piece therewith, the two segments forming a perfectly smooth spherical external surface, F F, free from lugs, ears, wings, or any other metallic protuberance on such external surface. D D is the flat base of the head. E is the metal of the hindmost part of the shell. G is the hollow or powder-space to contain the exploding-powder.

Figure 2:
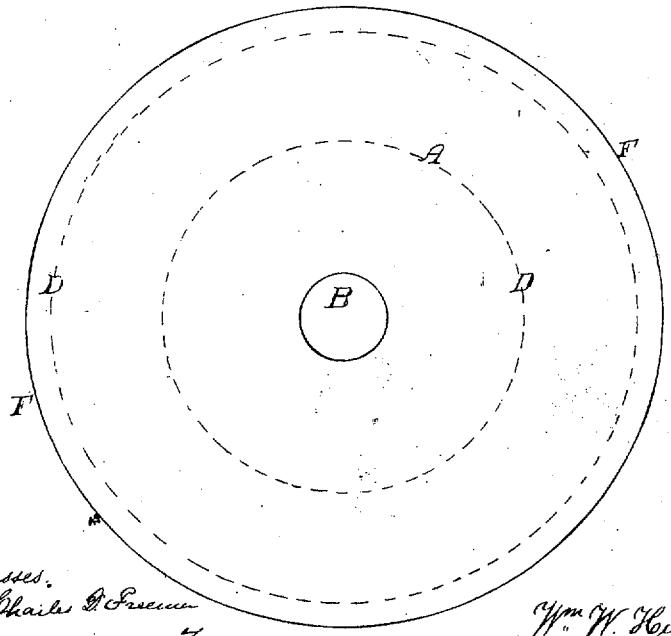

In Fig. 2, which represents a front view of the shell, A is the external front surface of this head, and B is the fuse-hole in or through the center of the head. The dotted lines D D show where the hindmost segment connects with the head. F F is the external surface. This form of head must have the fuse-hole through its center. The external surface of the shell must be spherical, free from lugs, ears, or other protuberance of metal, and the hindmost part of the sphere, as it recedes from the base, must be of the same or uniform thickness throughout, or slightly diminish in thickness toward the rear part, E, as is often occasioned by the rising of the core in casting the shell, in order to obtain the conditions of my invention. The *vis inertiæ* of the head over the *vis inertiæ* of the metal of the hinder part of the shell is increased by the proportional increase of thickness of the head, and diminished by the proportional diminution of thickness of the head. As a general rule, to make the thickness of the head through the fuse-hole twice as great as the thickness of the metal of the hinder part of the shell gives a good standard practical effect, and to diminish or increase this proportional thickness of the head diminishes or increases the intensity of the *vis inertiæ* of the head over the *vis inertiæ* of the hinder part, though still preserving the least displacement of the powder-space in proportion to such preponderance of the *vis inertiæ* of the foremost over the *vis inertiæ* of the hindmost part of the shell.

The fuse used should be a metallic one, in order to have its weight co-operate largely in favor of the *vis inertiæ* or weight of its head, and the ordinary sabot of hard wood should be used on the hindmost part of the shell, in order to hold the shell while passing out of the gun in the same position that it will naturally occupy in its flight. Experiments with this arrangement of metal of the shell, fired with the ordinary sabots of ash-wood and the fuse foremost in the gun, have proved it to fly with precision, have great strength to penetrate without fracture, and explode with uniformity.

I am aware that both spherical and oblong shells having eccentric hollows and re-enforcements around the fuse-hole have been used before my invention, and I do not claim such arrangement of metal nor their effects. They all differ materially from mine in their collective effects.

What I claim as my invention is—

The combination of the head or segment of the solid sphere, with flat base uniformly around the fuse-hole, with the segment of the hollow part, forming a spherical shell with flat-based head and externally smooth, as described.

WM. W. HUBBELL.

Witnesses:

CHARLES D. FREEMAN,

PENROSE FELL.